(12) United States Patent
Sugatani

(10) Patent No.: US 11,204,128 B2
(45) Date of Patent: Dec. 21, 2021

(54) WALL FIXING BRACKET AND HEAT SOURCE APPARATUS UNIT

(71) Applicant: NORITZ CORPORATION, Hyogo (JP)

(72) Inventor: Masaki Sugatani, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 16/842,641

(22) Filed: Apr. 7, 2020

(65) Prior Publication Data
US 2020/0370703 A1 Nov. 26, 2020

(30) Foreign Application Priority Data
May 23, 2019 (JP) .............................. JP2019-096889

(51) Int. Cl.
*F16M 11/00* (2006.01)
*F16M 11/04* (2006.01)
*F24H 9/06* (2006.01)

(52) U.S. Cl.
CPC ............. *F16M 11/045* (2013.01); *F24H 9/06* (2013.01)

(58) Field of Classification Search
None
See application file for complete search history.

(56) References Cited

U.S. PATENT DOCUMENTS

| | | | | | |
|---|---|---|---|---|---|
| 2,263,901 | A | * | 11/1941 | Olney | A47G 1/162 248/496 |
| 4,955,573 | A | * | 9/1990 | Horvath | F24H 9/06 248/154 |
| 5,487,518 | A | * | 1/1996 | McCraney | F24H 9/06 248/225.11 |
| 8,104,726 | B2 | * | 1/2012 | Hoernig | A47K 17/022 248/220.22 |
| 2003/0230397 | A1 | * | 12/2003 | Southwick | F28F 9/002 165/67 |
| 2006/0091271 | A1 | * | 5/2006 | Nowak | A47B 95/008 248/225.21 |
| 2018/0058720 | A1 | * | 3/2018 | Ando | F24H 9/02 |
| 2018/0231176 | A1 | * | 8/2018 | Sabounjian | F16M 13/02 |

FOREIGN PATENT DOCUMENTS

JP H01-91844 U 6/1989

* cited by examiner

*Primary Examiner* — Steven M Marsh
(74) *Attorney, Agent, or Firm* — Studebaker & Brackett PC

(57) ABSTRACT

A first bracket is attached to a heat source apparatus. A second bracket is fixed to a wall. The second bracket has an engagement portion over which the first bracket is hooked. The first bracket has a through hole through which the engagement portion is inserted. The first bracket has a plurality of protruding portions that protrude from an upper end of the through hole into the through hole. The plurality of protruding portions are arranged side by side along the upper end of the through hole.

12 Claims, 8 Drawing Sheets

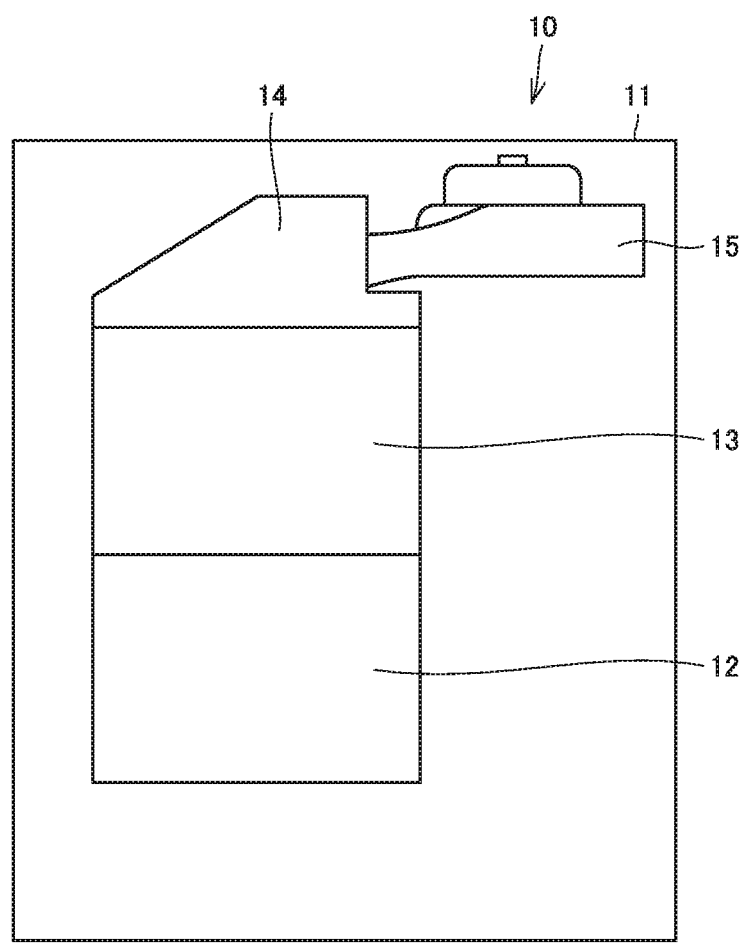

WALL FIXING BRACKET AND HEAT SOURCE APPARATUS UNIT

BACKGROUND OF THE INVENTION

Field of the Invention

The present invention relates to a wall fixing bracket and a heat source apparatus unit.

Description of the Background Art

A wall attachment unit used for attaching an apparatus such as a water heater to a wall is disclosed, for example, in Japanese Utility Model Laying-Open No. 01-91844 and the like.

In Japanese Utility Model Laying-Open No. 01-91844, an upper attachment plate and a lower attachment plate are fixed onto the back surface of the apparatus such as a water heater. Each of the upper attachment plate and the lower attachment plate has a lower edge provided with a recess portion. This recess portion is fitted into a protruding portion fixed to a wall so as to attach the apparatus such as a water heater to the wall.

SUMMARY OF THE INVENTION

In the configuration disclosed in Japanese Utility Model Laying-Open No. 01-91844, the attachment position of a heat source apparatus such as a water heater to a wall is determined based on the attachment position of the protruding portion to the wall. Thus, in the case where the heat source apparatus is misaligned with respect to an exhaust pipe connected to the heat source apparatus in the state where this heat source apparatus is attached to a wall, a wall fixing bracket such as a protruding portion needs to be reattached to the wall. For this reason, it has been desired to simplify the operation of attaching a heat source apparatus to a wall.

The present invention has been made to solve the above-described problem. An object of the present invention is to provide a wall fixing bracket and a heat source apparatus unit, by which a heat source apparatus is readily attached to a wall.

A wall fixing bracket of the present invention is a wall fixing bracket for attaching a heat source apparatus to a wall, and includes a first bracket and a second bracket. The first bracket is attached to the heat source apparatus. The second bracket is fixed to the wall. The second bracket has a first engagement portion over which the first bracket is hooked. The first bracket has a first hole through which the first engagement portion is inserted. The first bracket has a plurality of protruding portions that protrude from an upper end of the first hole into the first hole. The plurality of protruding portions are arranged side by side along the upper end of the first hole.

According to the wall fixing bracket of the present invention, the first engagement portion is inserted into the first hole and comes into contact with the upper end of the first hole through which the first bracket is hooked. A plurality of protruding portions are provided along the upper end of the first hole. Thus, in the state where the first bracket is hooked over the second bracket, the protruding portions restrict sliding of the first bracket with respect to the second bracket. Thereby, the heat source apparatus is less likely to be misaligned with respect to an exhaust pipe and the like, so that the heat source apparatus is readily attached to a wall.

In the wall fixing bracket, the second bracket has a bracket body. The first engagement portion is formed integrally with the bracket body and formed to be cut and raised from the bracket body in a direction crossing the bracket body.

Since the first engagement portion is formed by being cut and raised in this way, the first bracket is readily processed.

In the wall fixing bracket, the first engagement portion has an uppermost portion, a joint portion, and an inclined portion. The joint portion is located below the uppermost portion and joined to the bracket body. The inclined portion inclines to locate to be lower as approaching from the uppermost portion toward the joint portion and to be closer to the bracket body.

Thereby, the first bracket can be moved along the inclined portion of the first engagement portion. Accordingly, the first bracket can be hooked smoothly over the second bracket.

In the wall fixing bracket, the first bracket has an attachment portion below the first hole. The first bracket is attached to the heat source apparatus at the attachment portion.

Thereby, the first hole can be disposed above the heat source apparatus. Accordingly, the first engagement portion is readily inserted into the first hole. Therefore, the heat source apparatus is more readily attached to a wall.

In the wall fixing bracket, the first bracket has a first portion, a second portion, and a third portion. The first portion has the first hole. The second portion is located below the first portion and has the attachment portion. The third portion is located between the first portion and the second portion and inclined to be farther away from the second bracket as approaching from the first portion toward the second portion.

Thereby, a space in which the engagement portion is placed can be provided between the wall and the heat source apparatus.

In the wall fixing bracket, the second bracket has a second engagement portion over which the first bracket is hooked. The first bracket has a second hole through which the second engagement portion is inserted. The second hole has a flat upper end.

In this way, only the first hole is provided with a protruding portion but the second hole is not provided with a protruding portion. Thus, the first bracket is readily displaced from the second bracket in the state where the first engagement portion is inserted into the first hole and the second engagement portion is inserted into the second hole. Accordingly, the first bracket attached to the heat source apparatus is readily slid in the lateral direction with respect to the second bracket after the first bracket is hooked over the second bracket. Therefore, the heat source apparatus is more readily attached to a wall.

In the wall fixing bracket, the attachment portion is provided in a region other than a region directly below the first hole.

Thereby, the attachment portion and the like do not interfere with the first engagement portion when the first engagement portion is inserted into the first hole. Therefore, the heat source apparatus is more readily attached to a wall.

In the wall fixing bracket, the second bracket has a through hole through which a fixing member for fixing the second bracket to the wall is inserted. The through hole is provided in a region other than a region overlapping with the first bracket in a state where the first bracket is hooked over the second bracket.

Thereby, the first bracket does not interfere with the fixing member when the first bracket is hooked over the second bracket. Therefore, the heat source apparatus is more readily attached to a wall.

In the wall fixing bracket, each of the plurality of protruding portions has an arc shape in a view seen in a direction in which the first hole penetrates through the first bracket.

Thereby, the first engagement portion is readily slid along the arc shape of the first hole after the first bracket is hooked over the second bracket. Accordingly, the position of the heat source apparatus is readily adjusted even after the first bracket is hooked over the second bracket.

In the wall fixing bracket, the second bracket has a position indicating portion that indicates a position of a pipe connected to the heat source apparatus.

By disposing the second bracket based on this position indicating portion, the second bracket is readily positioned with respect to an already-placed exhaust pipe. Therefore, the heat source apparatus is more readily attached to a wall.

In the wall fixing bracket, the first bracket has an engagement position indicating portion that indicates an engagement position of the first engagement portion.

By disposing the first bracket with respect to the second bracket based on this engagement position indicating portion, the first bracket is readily positioned with respect to the second bracket. Therefore, the heat source apparatus is more readily attached to a wall.

A heat source apparatus unit of the present invention includes: the wall fixing bracket; and a heat source apparatus attached to the wall by the wall fixing bracket.

According to the heat source apparatus unit of the present invention, the first engagement portion is inserted into the first hole and comes into contact with the upper end of the first hole through which the first bracket is hooked. The upper end of the first hole is provided with a plurality of protruding portions. Thus, the protruding portions restrict sliding of the first bracket with respect to the second bracket in the state where the first bracket is hooked over the second bracket. Thereby, the heat source apparatus is less likely to be misaligned with respect to an exhaust pipe and the like, so that the heat source apparatus is readily attached to a wall.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a front view showing the configuration of a heat source apparatus included in the heat source apparatus unit shown in FIG. 1.

DESCRIPTION OF THE PREFERRED EMBODIMENTS

Figure 1:
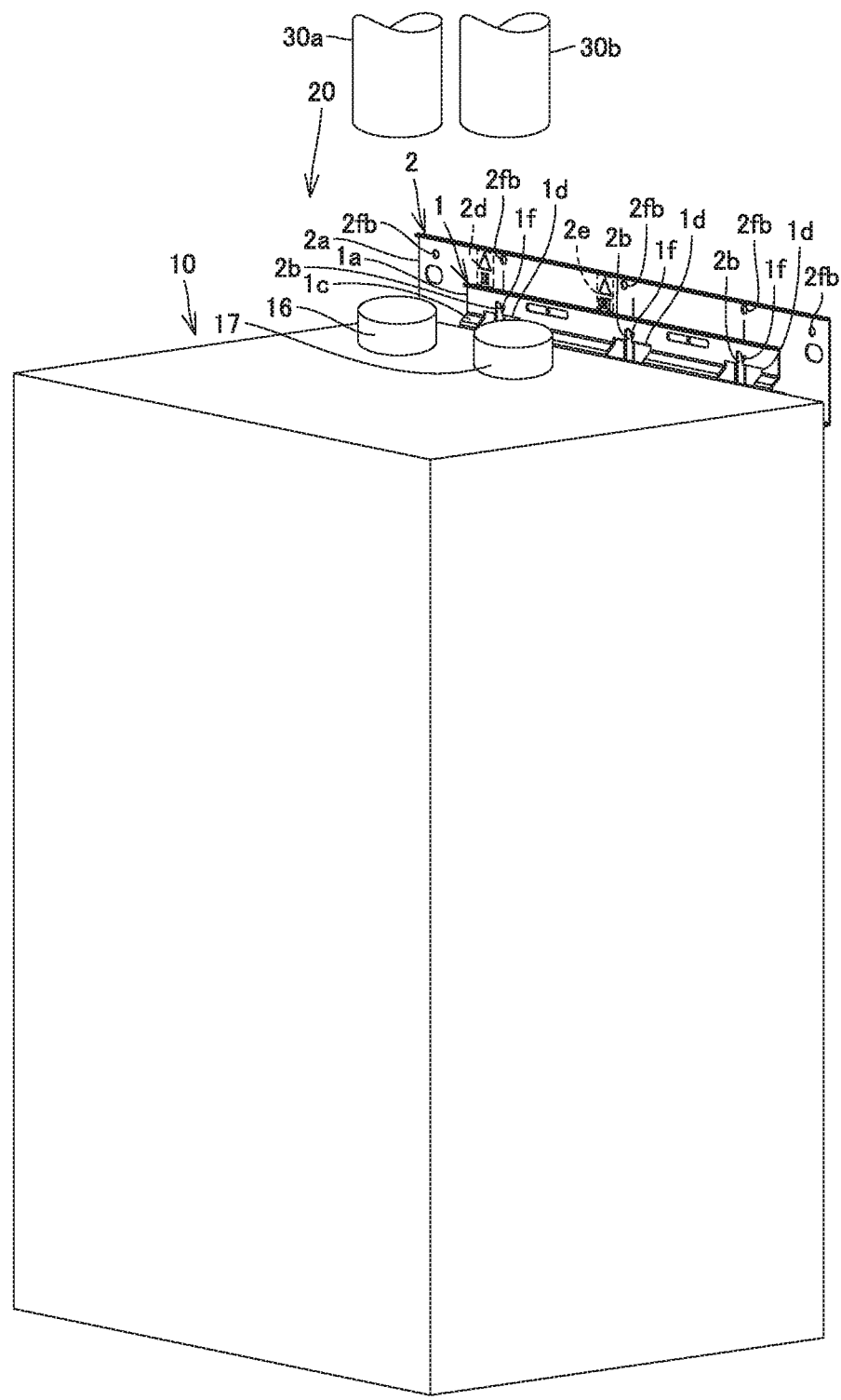
FIG. 1 is a perspective view showing the configuration of a heat source apparatus unit in one embodiment of the present invention.

The embodiments of the present invention will be hereinafter described in detail with reference to the accompanying drawings.

In the following specification and the accompanying drawings, the same or corresponding components will be designated by the same reference characters, and the description thereof will not be repeated. Also, in the accompanying drawings, some configurations may be omitted or simplified for convenience of illustration. Furthermore, embodiments and modifications thereof may be at least partially arbitrarily combined with each other.

<Configuration of Heat Source Apparatus Unit>

First, the configuration of a heat source apparatus unit according to one embodiment of the present invention will be described with reference to FIGS. 1 and 2.

Figure 2:
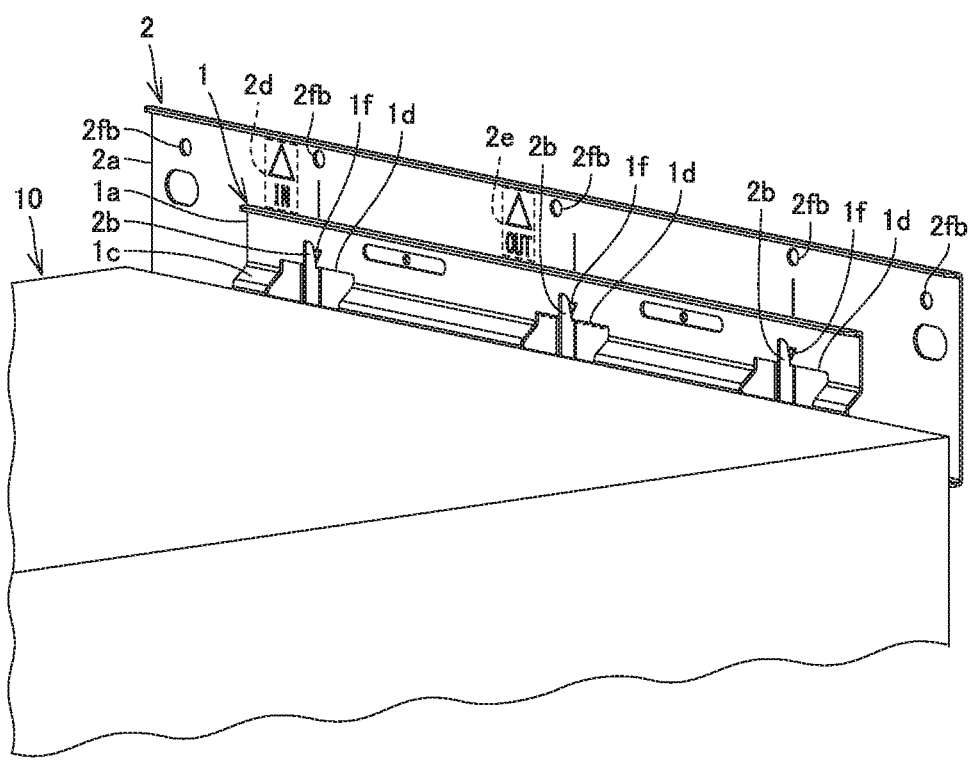
FIG. 2 is an enlarged perspective view showing, in an enlarged manner, the configuration of a wall fixing bracket used for the heat source apparatus unit shown in FIG. 1.

As shown in FIGS. 1 and 2, a heat source apparatus unit 20 in the present embodiment has a heat source apparatus 10 and wall fixing brackets 1 and 2. Wall fixing brackets 1 and 2 are used for attaching heat source apparatus 10 to a wall.

Wall fixing brackets 1 and 2 have a first bracket 1 and a second bracket 2. First bracket 1 is attached to heat source apparatus 10. First bracket 1 is attached, for example, to the upper end portion of the back surface of heat source apparatus 10.

Second bracket 2 is fixed to a wall. First bracket 1 attached to heat source apparatus 10 is attached to second bracket 2 fixed to the wall. Thereby, heat source apparatus 10 is attached to the wall. An inlet pipe 30a and an exhaust pipe 30b are connected to connection portions 16 and 17, respectively, of heat source apparatus 10 attached to the wall.

<Wall Fixing Bracket>

Then, the configuration of the wall fixing bracket according to the present embodiment will be described with reference FIGS. 3 to 6.

Figure 3:
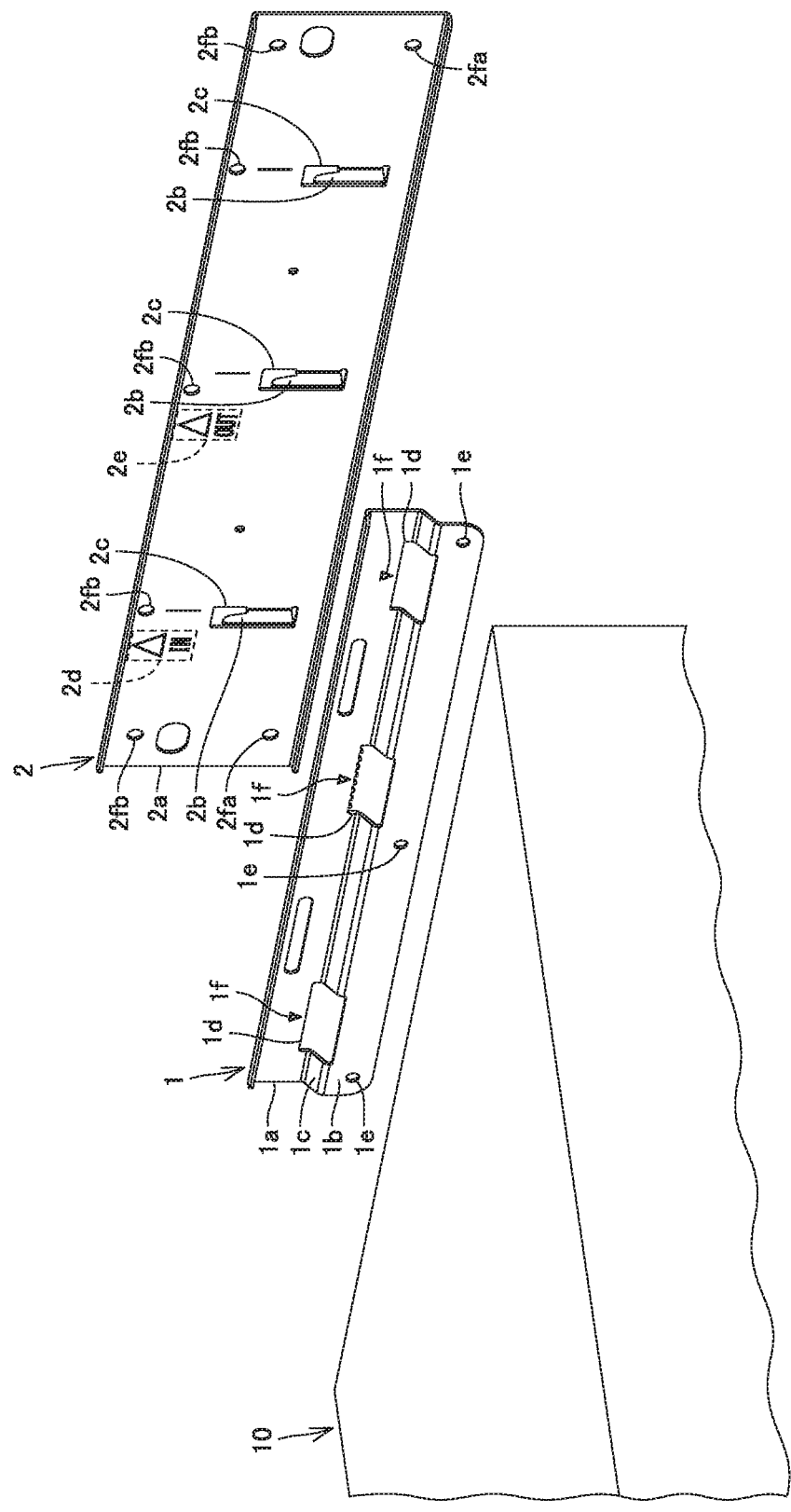
FIG. 3 is an exploded perspective view of the configuration of the wall fixing bracket shown in FIG. 2 in a disassembled state, as seen from the heat source apparatus side.

As shown in FIG. 3, first bracket 1 is made of metal, for example. First bracket 1 has a first portion 1a, a second portion 1b, and a third portion 1c. First portion 1a, second portion 1b, and third portion 1c are integrated with one another. First portion 1a, second portion 1b, and third portion 1c are formed by bending one plate.

Second portion 1b is located below first portion 1a. Third portion 1c is located between first portion 1a and second portion 1b. The upper end of third portion 1c is joined to the lower end of first portion 1a. The lower end of third portion 1c is joined to the upper end of second portion 1b.

Third portion 1c is inclined so as to be farther away from second bracket 2 as approaching from first portion 1a toward second portion 1b. The upper end of third portion 1c is located at a position closer to second bracket 2 and more distant from heat source apparatus 10 than the lower end of third portion 1c is.

First portion 1a and second portion 1b extend in parallel with each other, for example. Third portion 1c inclines with respect to both first portion 1a and second portion 1b.

First portion 1a is provided with a plurality of through holes 1d (the first holes). The plurality of through holes 1d are arranged side by side at intervals from each other in the longitudinal direction (the left and right direction) of first portion 1a. Each of the plurality of through holes 1d may be provided not only to extend in first portion 1a but also to extend from first portion 1a to third portion 1c. Each of the plurality of through holes 1d may also be provided so as to extend from first portion 1a through third portion 1c to second portion 1b.

Second portion 1b is provided with a plurality of screw insertion holes 1e (attachment portions). Each of the plurality of screw insertion holes 1e is disposed below a corresponding one of the plurality of through holes 1d. Each of the plurality of screw insertion holes 1e is located in a region other than a region directly below a corresponding one of through holes 1d.

Figure 4:
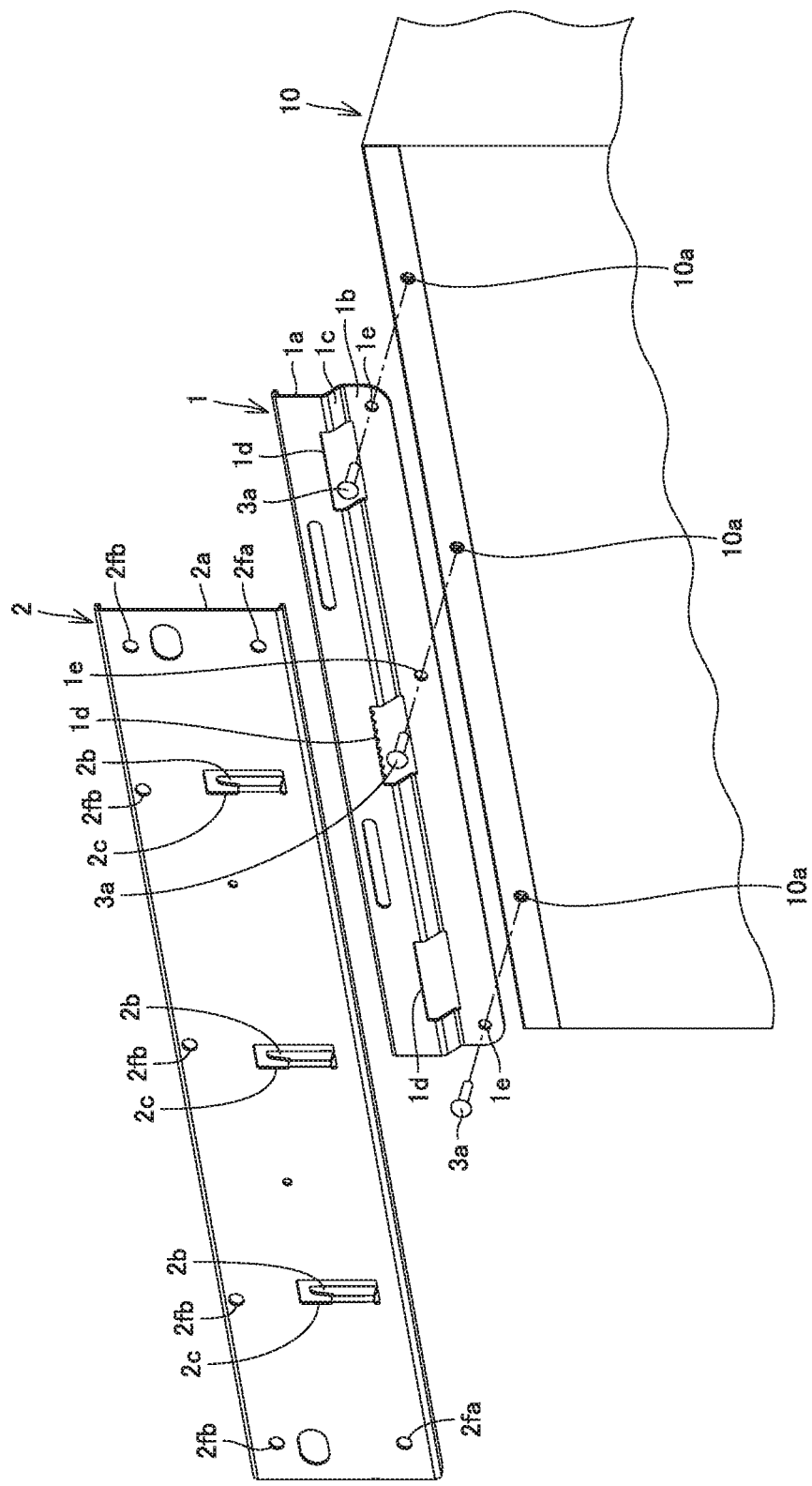
FIG. 4 is an exploded perspective view of the configuration of the wall fixing bracket shown in FIG. 2 in a disassembled state, as seen from the wall side.

As shown in FIG. 4, first bracket 1 is attached to heat source apparatus 10 through each of the plurality of screw insertion holes 1e. Specifically, a screw 3a is inserted into screw insertion hole 1e and thereafter screwed into a screw hole 10a provided in the back surface of heat source apparatus 10. In this way, first bracket 1 is attached to heat source apparatus 10, for example, with screw 3a.

As shown in FIG. 3, second bracket 2 is made of metal, for example. Second bracket 2 has a bracket body 2a and a plurality of engagement portions 2b. Bracket body 2a and the plurality of engagement portions 2b are integrated with each other. Each of the plurality of engagement portions 2b has a configuration that is cut and raised from bracket body 2a. Each of the plurality of engagement portions 2b is cut and raised from bracket body 2a in the direction crossing (for example, orthogonal to) bracket body 2a.

Each of the plurality of engagement portions 2b serves as a portion over which first bracket 1 is hooked. Each of the plurality of engagement portions 2b is inserted into a corresponding one of through holes 1d in first bracket 1, so that first bracket 1 is hooked over the plurality of engagement portions 2b. Bracket body 2a is provided with a through hole 2c that is formed by cutting and raising each of the plurality of engagement portions 2b. The plurality of engagement portions 2b are arranged side by side at intervals from each other in the longitudinal direction (the left and right direction) of bracket body 2a.

Figure 5:
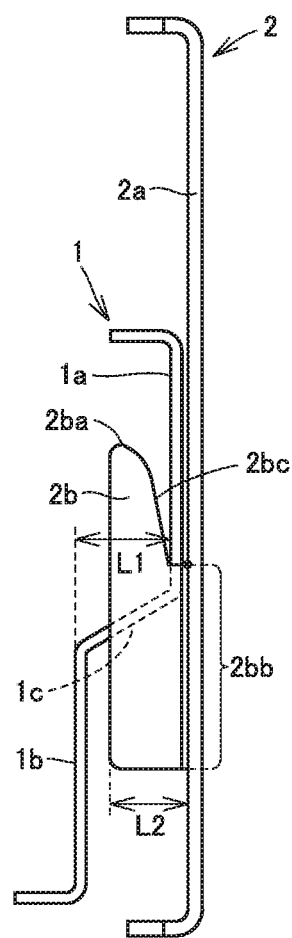
FIG. 5 is a side view showing the configuration of the wall fixing bracket shown in FIG. 2.

As shown in FIG. 5, each of the plurality of engagement portions 2b has an uppermost portion 2ba, a joint portion 2bb, and an inclined portion 2bc. Uppermost portion 2ba of engagement portion 2b is located at the highest position in engagement portion 2b. Joint portion 2bb of engagement portion 2b is a portion of engagement portion 2b that is joined to bracket body 2a.

Inclined portion 2bc of engagement portion 2b is located between uppermost portion 2ba and the upper end of joint portion 2bb. Inclined portion 2bc inclines so as to extend downward as inclined portion 2bc extends from uppermost portion 2ba toward the upper end of joint portion 2bb. In other words, inclined portion 2bc has a downslope inclination that extends from uppermost portion 2ba toward the upper end of joint portion 2bb. Furthermore, inclined portion 2bc inclines so as to be closer to bracket body 2a as inclined portion 2bc extends from uppermost portion 2ba toward the upper end of joint portion 2bb.

A distance L1 between first portion 1a and second portion 1b of first bracket 1 in the front-rear direction is greater than a dimension L2 of a portion of engagement portion 2b that protrudes forward from bracket body 2a. Thereby, engagement portion 2b is inserted into through hole 1d of first bracket 1, so that first bracket 1 can be hooked thereover.

As shown in FIG. 3, second bracket 2 is provided with a plurality of through holes 2fa and 2fb. Each of the plurality of through holes 2fa and 2fb is a hole through which a fixing member (for example, a screw, a pin, and the like) for fixing second bracket 2 to a wall is inserted.

Second bracket 2 is fixed to the wall through the plurality of through holes 2fa and 2fb. Specifically, a fixing member (not shown) is inserted into each of the plurality of through holes 2fa and 2fb and thereafter fixed to the wall. The fixing member is a screw, for example, and inserted into each of the plurality of through holes 2fa and 2fb and thereafter screwed into an anchor embedded in the wall. Thus, second bracket 2 is fixed to the wall by the fixing member.

Figure 6:
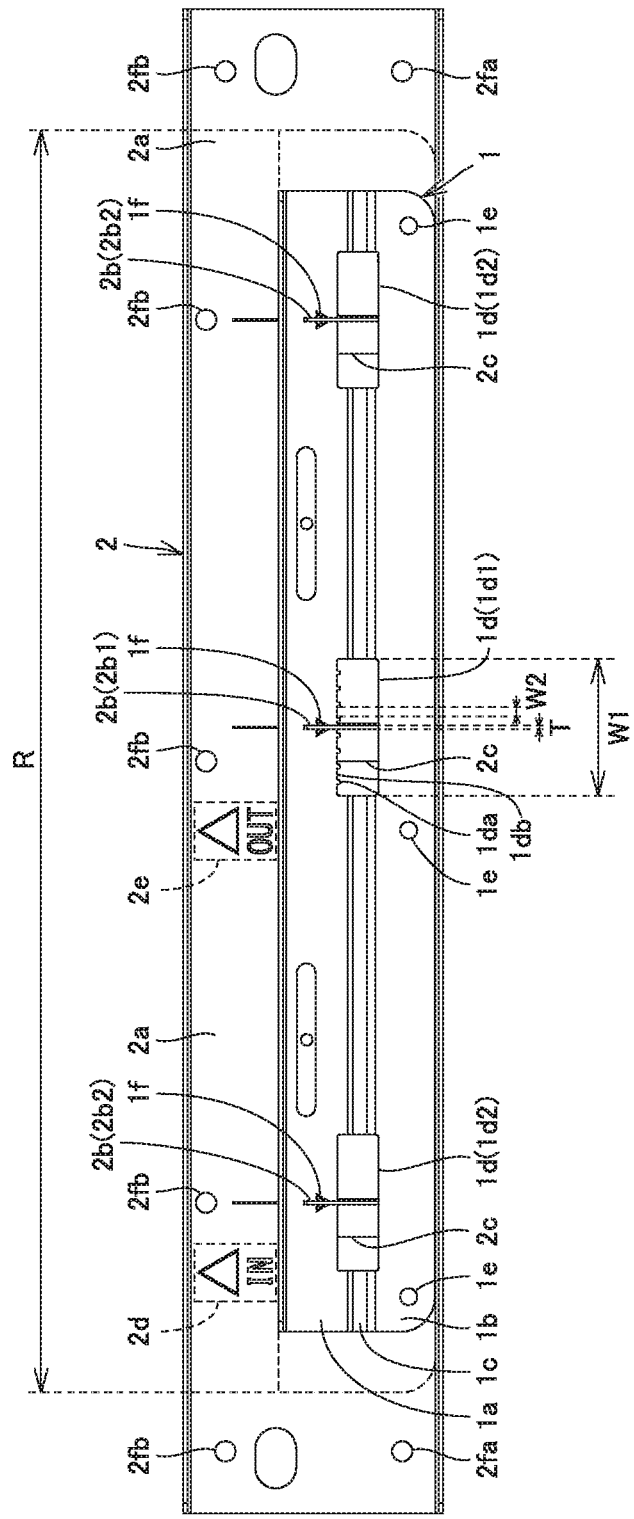
FIG. 6 is a front view showing the state where a first bracket is hooked over a second bracket.

As shown in FIG. 6, each of through holes 2fa and 2fb is provided in a region other than a region R that overlaps with first bracket 1 in the state where first bracket 1 is hooked over second bracket 2. Specifically, first bracket 1 is slidable in the left and right direction with respect to second bracket 2. Each of through holes 2fa and 2fb is provided in a region other than region R that can overlap with first bracket 1 by sliding first bracket 1 with respect to second bracket 2.

Through hole 2fa is located in region R in the left and right direction (in the direction in which first bracket 1 slides with respect to second bracket 2). Through hole 2fb is located above region R.

As shown in FIG. 3, first portion 1a of first bracket 1 has a plurality of engagement position indicating portions 1f. Each of engagement position indicating portions 1f indicates the engagement position of engagement portion 2b. Each of engagement position indicating portions 1f is located directly above a corresponding one of through holes 1d. Each of engagement position indicating portions 1f is a graphical indication having an inverted triangular shape, for example.

Bracket body 2a of second bracket 2 has position indicating portions 2d and 2e indicating the positions of pipes 30a and 30b, respectively (FIG. 1). Position indicating portion 2d indicates the position of an inlet pipe (an inlet tube) 30a (FIG. 1). Position indicating portion 2e indicates the position of an exhaust pipe (an exhaust tube) 30b.

Position indicating portion 2d is a graphical indication including a triangular figure and characters of "IN", for example. Position indicating portion 2e is a graphical indication including a triangular figure and characters of "OUT", for example.

As shown in FIG. 6, in the present embodiment, first bracket 1 has a plurality of protruding portions 1da. Each of the plurality of protruding portions 1da is integrated with and connected to first portion 1a. Each of the plurality of protruding portions 1da protrudes from the upper end of through hole 1d into through hole 1d.

The plurality of protruding portions 1da are arranged side by side at a distance 1db from each other along the upper end of through hole 1d. The plurality of protruding portions 1da are arranged side by side at distance 1db from each other in the left and right direction (in the longitudinal direction of first portion 1a). A width W2 of distance 1db between two adjacent protruding portions 1da is larger than a thickness T of engagement portion 2b.

A dimension W1 of through hole 1d in the left and right direction is larger than thickness T of engagement portion 2b and larger than width W2 of distance 1db between two adjacent protruding portions 1da. Dimension W1 of through hole 1d in the left and right direction is set based on the distance in which first bracket 1 is desired to slide in the left and right direction with respect to second bracket 2 in the state where engagement portion 2*b* is inserted into through hole 1*d*.

The plurality of through holes 1*d* include a first through hole 1*d*1 (the first hole) and a second through hole 1*d*2 (the second hole). First through hole 1*d*1 has an upper end provided with the above-mentioned plurality of protruding portions 1*da*. On the other hand, second through hole 1*d*2 has a flat upper end provided with no protruding portion.

In the case where three through holes 1*d* are arranged side by side in first bracket 1, a center through hole 1*d* among these three through holes 1*d* may be defined as first through hole 1*d*1 while two other through holes 1*d* on both sides may be defined as second through holes 1*d*2.

The plurality of engagement portions 2*b* include a first engagement portion 2*b*1 and a second engagement portion 2*b*2. First engagement portion 2*b*1 is inserted into first through hole 1*d*1 and comes into contact with the upper end of first through hole 1*d*1. Second engagement portion 2*b*2 is inserted into second through hole 1*d*2 and comes into contact with the upper end of second through hole 1*d*2.

Furthermore, all of the plurality of through holes 1*d* may also be defined as first through holes 1*d*1.

<Method of Attaching Heat Source Apparatus to Wall>

The following is an explanation with reference to FIGS. 1 to 4 about a method of attaching heat source apparatus 10 to a wall using wall fixing brackets 1 and 2 of the present embodiment.

As shown in FIG. 3, second bracket 2 is first fixed to a wall. In this case, a fixing member is inserted into each of the plurality of through holes 2*fa* and 2*fb* of second bracket 2 and thereafter fixed to the wall. Specifically, an anchor (not shown) is embedded in the outer wall or the like of a house. Fixing members (for example, screws) inserted into the plurality of through holes 2*fa* and 2*fb* are screwed into such anchors, so that second bracket 2 is fixed to the wall.

When second bracket 2 is fixed to the wall, second bracket 2 is positioned with respect to the positions of inlet pipe 30*a* and exhaust pipe 30*b* (FIG. 1). Specifically, second bracket 2 is fixed to the wall in the state where the position of position indicating portion 2*d* is aligned with the position of inlet pipe 30*a* and the position of position indicating portion 2*e* is aligned with the position of exhaust pipe 30*b*.

As shown in FIG. 4, first bracket 1 is attached to heat source apparatus 10. In this case, screw 3*a* is inserted into screw insertion hole 1*e* and thereafter screwed into screw hole 10*a* on the back surface of heat source apparatus 10.

As shown in FIG. 2, engagement portion 2*b* of second bracket 2 is inserted into through hole 1*d* of first bracket 1. Thereby, engagement portion 2*b* comes into contact with the upper end of through hole 1*d*, so that first bracket 1 attached to heat source apparatus 10 is hooked over second bracket 2.

When engagement portion 2*b* is inserted into through hole 1*d*, through hole 1*d* is positioned with respect to the position of engagement portion 2*b*. Specifically, engagement portion 2*b* is inserted into through hole 1*d* in the state where the position of engagement position indicating portion 1*f* is aligned with the position of engagement portion 2*b*.

Thus, heat source apparatus 10 is attached to a wall.

As shown in FIG. 1, inlet pipe 30*a* and exhaust pipe 30*b* are connected to connection portions 16 and 17, respectively, of heat source apparatus 10 after heat source apparatus 10 is attached to a wall. In the case where the positions of inlet pipe 30*a* and exhaust pipe 30*b* are displaced from the respective positions of connection portions 16 and 17 in heat source apparatus 10, first bracket 1 is slid in the left and right direction with respect to second bracket 2. Specifically, the position of through hole 1*d* is moved in the left and right direction with respect to engagement portion 2*b*. Thereby, the positions of inlet pipe 30*a* and exhaust pipe 30*b* are aligned with the respective positions of connection portions 16 and 17 in heat source apparatus 10.

<Modification>

Then, the configuration of a modification will be described with reference to FIG. 7.

Figure 7:
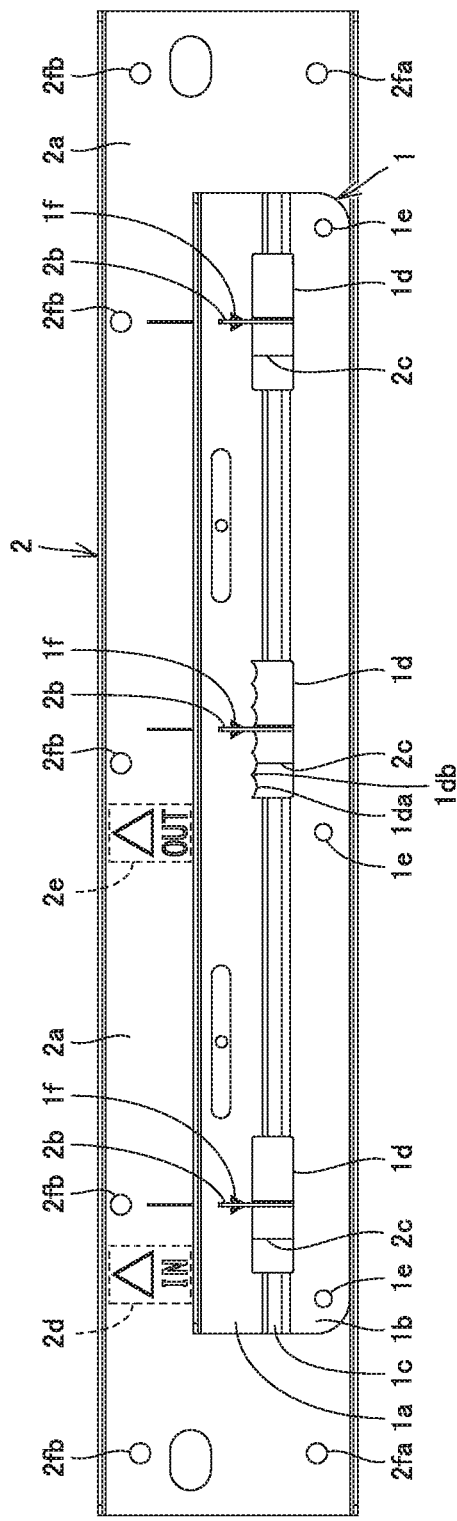
FIG. 7 is a front view showing the state where a modification of the first bracket is hooked over the second bracket.

As shown in FIG. 7, each of the plurality of protruding portions 1*da* has an arc shape in a view seen in the direction in which through hole 1*d* penetrates through first bracket 1 (in the front-rear direction). In the case where each protruding portion 1*da* has an arc shape, the plurality of protruding portions 1*da* may be arranged in a manner connecting to each other in the left and right direction. Also, a distance 1*db* defined by a flat surface as shown in FIG. 6 may exist between two protruding portions 1*da* adjacent to each other.

Since the configuration of the present modification other than the above is almost the same as the configuration of the embodiment shown in FIGS. 1 to 6, the same components will be designated by the same reference characters, and description thereof will not be repeated.

<Configuration of Heat Source Apparatus>

The following is an explanation with reference to FIG. 8 about the configuration of a water heating apparatus as an example of a heat source apparatus according to one embodiment of the present invention.

It is to be noted that the heat source apparatus is not limited to a water heating apparatus but, for example, may be a hot water apparatus, a heating apparatus, a water heating apparatus for bath with hot water heating, and the like. Furthermore, the heat source apparatus may be a fuel gas combustion type or may be an oil combustion type. Also, the heat source apparatus may be a tank type or may be an instantaneously heating type. Furthermore, the heat source apparatus is not limited to a water heating apparatus of an exhaust suction and combustion type, but may be a water heating apparatus of an extrusion combustion type.

As shown in FIG. 8, a water heating apparatus 10 mainly includes an exterior case 11, a combustion apparatus 12, a heat exchanger 13, an exhaust box 14, and a fan assembly 15.

Combustion apparatus 12, heat exchanger 13, exhaust box 14, and fan assembly 15 are disposed in exterior case 11. Combustion apparatus 12 serves to produce combustion gas that is to be heat-exchanged in heat exchanger 13. Heat exchanger 13 is disposed above combustion apparatus 12.

Heat exchanger 13 includes a primary heat exchanger and a secondary heat exchanger, for example. The primary heat exchanger is a heat exchanger of a sensible heat recovery type for collecting sensible heat of combustion gas produced in combustion apparatus 12. The secondary heat exchanger is a heat exchanger of a latent heat recovery type for collecting latent heat of combustion gas produced in combustion apparatus 12.

Exhaust box 14 is disposed above heat exchanger 13. Fan assembly 15 is connected to exhaust box 14.

Exhaust box 14 forms a passage of the flow of combustion gas between heat exchanger 13 and fan assembly 15. By this exhaust box 14, combustion gas having been heat-exchanged in heat exchanger 13 can be guided to fan assembly 15. Exhaust box 14 is attached to heat exchanger 13 and located downstream of the flow of combustion gas from heat exchanger 13.

Fan assembly 15 serves to suction combustion gas having flowed through heat exchanger 13 (having been heat-exchanged in heat exchanger 13) so as to discharge combustion gas to the outside of water heating apparatus 10. Fan assembly 15 is connected to exhaust pipe 30b (FIG. 1) located outside water heating apparatus 10.

Fan assembly 15 is located downstream of the flow of combustion gas from exhaust box 14 and heat exchanger 13. In other words, in water heating apparatus 10, combustion apparatus 12, heat exchanger 13, exhaust box 14, and fan assembly 15 are arranged in this order from upstream to downstream along the flow of combustion gas produced in combustion apparatus 12. Since combustion gas is suctioned and discharged by fan assembly 15 in this arrangement, water heating apparatus 10 in the present embodiment is configured as a water heating apparatus of an exhaust suction and combustion type.

In the above-mentioned water heating apparatus 10, water supplied from a water supply pipe to the secondary heat exchanger is preheated by collecting the latent heat of combustion gas produced in combustion apparatus 12. Hot water preheated in the secondary heat exchanger is supplied to the primary heat exchanger. Hot water supplied to the primary heat exchanger is heated by collecting the sensible heat of combustion gas produced in combustion apparatus 12. Hot water heated in the primary heat exchanger is supplied to the outside of water heating apparatus 10 through a hot water delivery pipe.

Furthermore, water is controlled to be supplied from the water supply pipe through a bypass pipe to the hot water delivery pipe. Thereby, the temperature of hot water in the hot water delivery pipe is adjusted. Then, hot water adjusted to a desired temperature is supplied from the hot water delivery pipe.

Effect of the Present Embodiment

Then, the effect of the present embodiment will be described.

According to the present embodiment, as shown in FIG. 6, engagement portion 2b is inserted into through hole 1d and comes into contact with the upper end of through hole 1d through which first bracket 1 is hooked. The plurality of protruding portions 1da are provided along the upper end of through hole 1d. Thus, in the state where first bracket 1 is hooked over second bracket 2, the plurality of protruding portions 1da restrict sliding of first bracket 1 with respect to second bracket 2 in the left and right direction. Thereby, heat source apparatus 10 is less likely to be misaligned with respect to pipes (inlet pipe 30a, exhaust pipe 30b) and the like, so that heat source apparatus 10 is readily attached to a wall.

Also according to the present embodiment, second bracket 2 has bracket body 2a as shown in FIG. 3. Engagement portion 2b is formed integrally with bracket body 2a and has a configuration that is cut and raised from bracket body 2a in the direction crossing bracket body 2a. Thus, one plate is cut and a part of this plate is bent at the cut portion from a remaining portion of the plate, so that bracket body 2a and engagement portion 2b can be formed. Accordingly, bracket body 2a and engagement portion 2b are readily processed.

According to the present embodiment, engagement portion 2b has uppermost portion 2ba and joint portion 2bb as shown in FIG. 5. Joint portion 2bb is located below uppermost portion 2ba and joined to bracket body 2a. Engagement portion 2b has inclined portion 2bc that inclines to locate to be lower as approaching from uppermost portion 2ba toward joint portion 2bb and to be closer to bracket body 2a. Thereby, first bracket 1 can be moved along inclined portion 2bc of engagement portion 2b when engagement portion 2b is inserted into through hole 1d of first bracket 1. Thus, first bracket 1 can be smoothly hooked over second bracket 2.

Furthermore, according to the present embodiment, first bracket 1 has screw insertion hole 1e below through hole 1d as shown in FIG. 6. First bracket 1 is attached to heat source apparatus 10 through screw insertion hole 1e. Thereby, through hole 1d can be provided above heat source apparatus 10 as shown in FIG. 2. Thus, the operation of inserting engagement portion 2b into through hole 1d is readily performed. Therefore, heat source apparatus 10 is more readily attached to a wall.

Furthermore, according to the present embodiment, first bracket 1 has first portion 1a, second portion 1b, and third portion 1c as shown in FIG. 5. This third portion 1c is located between first portion 1a and second portion 1b. Also, third portion 1c inclines to be farther away from second bracket 2 as third portion 1c extends from first portion 1a toward second portion 1b. This can provide a space in which engagement portion 2b is placed between the wall and heat source apparatus 10.

According to the present embodiment, as shown in FIG. 6, through hole 1d2 through which second engagement portion 2b2 is inserted has a flat upper end that is provided with no protruding portion. In this way, only through hole 1d1 is provided with a plurality of protruding portions 1da, but other through holes 1d2 are provided with no protruding portion. Thereby, the position of first bracket 1 in the left and right direction is readily displaced with respect to second bracket 2 in the state where engagement portion 2b is inserted into through hole 1d. For example, only one side of heat source apparatus 10 having first bracket 1 attached thereto can be raised so as to cause first bracket 1 to slide with respect to second bracket 2 in the left and right direction. Thus, the entire heat source apparatus 10 does not have to be raised. Accordingly, the position of heat source apparatus 10 in the left and right direction is readily finely adjusted, and heat source apparatus 10 is more readily attached to a wall.

According to the present embodiment, screw insertion hole 1e is provided in a region other than the region directly below through hole 1d as shown in FIG. 6. Thereby, screw 3a inserted into screw insertion hole 1e as shown in FIG. 4 does not interfere with engagement portion 2b when engagement portion 2b is inserted into through hole 1d. Therefore, heat source apparatus 10 is more readily attached to a wall.

According to the present embodiment, as shown in FIG. 6, second bracket 2 has through holes 2fa and 2fb through which fixing members for fixing second bracket 2 to a wall are inserted. Through holes 2fa and 2fb each are provided in a region other than region R that overlaps with first bracket 1 in the state where first bracket 1 is hooked over second bracket 2. Thereby, the fixing member does not interfere with first bracket 1 when first bracket 1 is hooked over second bracket 2. Therefore, heat source apparatus 10 is more readily attached to a wall.

Furthermore, according to the present embodiment, each of the plurality of protruding portions 1da may have an arc shape in a view seen in the direction in which through hole 1d penetrates through first bracket 1 (in the front-rear direction), as shown in FIG. 7. Thereby, engagement portion 2b is readily slid in the left and right direction along the arc shape of each protruding portion 1da after first bracket 1 is hooked over second bracket 2. Thus, the position of heat source apparatus 10 is more readily adjusted even after first bracket 1 is hooked over second bracket 2.

According to the present embodiment, as shown in FIG. 3, second bracket 2 has position indicating portions 2d and 2e that indicate the positions of pipes 30a and 30b, respectively, (FIG. 1) connected to heat source apparatus 10. Thereby, heat source apparatus 10 is readily positioned with respect to already-placed pipes 30a and 30b. Therefore, heat source apparatus 10 is more readily attached to a wall.

According to the present embodiment, first bracket 1 has engagement position indicating portion if that indicates the engagement position of engagement portion 2b as shown in FIG. 3. Thereby, first bracket 1 is readily positioned with respect to second bracket 2. Therefore, heat source apparatus 10 is more readily attached to a wall.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A wall fixing bracket for attaching a heat source apparatus to a wall, the wall fixing bracket comprising:
   a first bracket attached to the heat source apparatus; and
   a second bracket fixed to the wall, wherein
   the second bracket has a first engagement portion over which the first bracket is hooked,
   the first bracket has a first hole through which the first engagement portion is inserted,
   the first bracket has a plurality of protruding portions that protrude from an upper end of the first hole into the first hole, and the plurality of protruding portions are arranged in a side by side direction along the upper end of the first hole,
   wherein the second bracket has a bracket body provided with a through hole,
   the through hole has a pair of side portions facing each other in the side by side direction, and
   the first engagement portion is connected to one of the pair of side portions of the through hole.

2. The wall fixing bracket according to claim 1, wherein the first engagement portion is formed integrally with the bracket body and formed to be cut and raised from the bracket body in a direction crossing the bracket body.

3. The wall fixing bracket according to claim 2, wherein the first engagement portion has
   an uppermost portion,
   a joint portion located below the uppermost portion and joined to the bracket body, and
   an inclined portion that inclines to locate to be lower as approaching from the uppermost portion toward the joint portion and to be closer to the bracket body.

4. The wall fixing bracket according to claim 1, wherein
   the first bracket has an attachment portion below the first hole, and
   the first bracket is attached to the heat source apparatus at the attachment portion.

5. The wall fixing bracket according to claim 4, wherein the first bracket has
   a first portion having the first hole,
   a second portion located below the first portion and having the attachment portion, and
   a third portion located between the first portion and the second portion, and inclined to be farther away from the second bracket as approaching from the first portion toward the second portion.

6. The wall fixing bracket according to claim 1, wherein
   the second bracket has a second engagement portion over which the first bracket is hooked,
   the first bracket has a second hole through which the second engagement portion is inserted, and
   the second hole has a flat upper end.

7. The wall fixing bracket according to claim 4, wherein the attachment portion is provided in a region other than a region directly below the first hole.

8. The wall fixing bracket according to claim 1, further comprising a fixing member which is inserted through the through hole to fix the second bracket to the wall; and
   the through hole is provided in a region other than a region overlapping with the first bracket in a state where the first bracket is hooked over the second bracket.

9. The wall fixing bracket according to claim 1, wherein each of the plurality of protruding portions has an arc shape in a view seen in a direction in which the first hole penetrates through the first bracket.

10. The wall fixing bracket according to claim 1, wherein the second bracket has a position indicating portion that indicates a position of a pipe connected to the heat source apparatus.

11. The wall fixing bracket according to claim 1, wherein the first bracket has an engagement position indicating portion that indicates an engagement position of the first engagement portion.

12. A heat source apparatus unit comprising:
    the wall fixing bracket according to claim 1; and
    a heat source apparatus attached to the wall by the wall fixing bracket.

* * * * *